United States Patent

[11] 3,539,150

| [72] | Inventor | Robert F. Conrad<br>Spring Hill, Maryland |
|------|----------|-------------------------------------------|
| [21] | Appl. No. | 648,436 |
| [22] | Filed | June 23, 1967 |
| [45] | Patented | Nov. 10, 1970 |
| [73] | Assignee | Jamesbury Corporation<br>Worcester, Massachusetts<br>a corporation of Massachusetts |

[54] FLUID VALVE
12 Claims, 6 Drawing Figs.

[52] U.S. Cl.................................................. 251/228,
251/298, 251/319; 137/525.5
[51] Int. Cl........................................................ F16k 1/16
[50] Field of Search........................................... 251/213,
228, 298, 303, 319; 137/525, 525.3, 525.7, 527.4,
527.8, 528, 532; 210/117

[56] References Cited
UNITED STATES PATENTS

| 1,000,719 | 8/1911 | Cram.......................... | 137/527X |
| 1,442,654 | 1/1923 | Douglas....................... | 251/298X |
| 2,394,471 | 2/1946 | Paul............................ | 251/228 |

*Primary Examiner*—William F. O'Dea
*Assistant Examiner*—David R. Matthews
*Attorney*—Robert F. Conrad ABSTRACT: A quick-opening valve has an annular valve seat circumscribing the fluid flow channel. A valve disc closes the valve by closing the central aperture in this annular valve seat when seated against it. In the open position the valve disc lies flush against a portion of the interior walls of the valve body upstream of the seat, the disc flexing to assume its flush position.

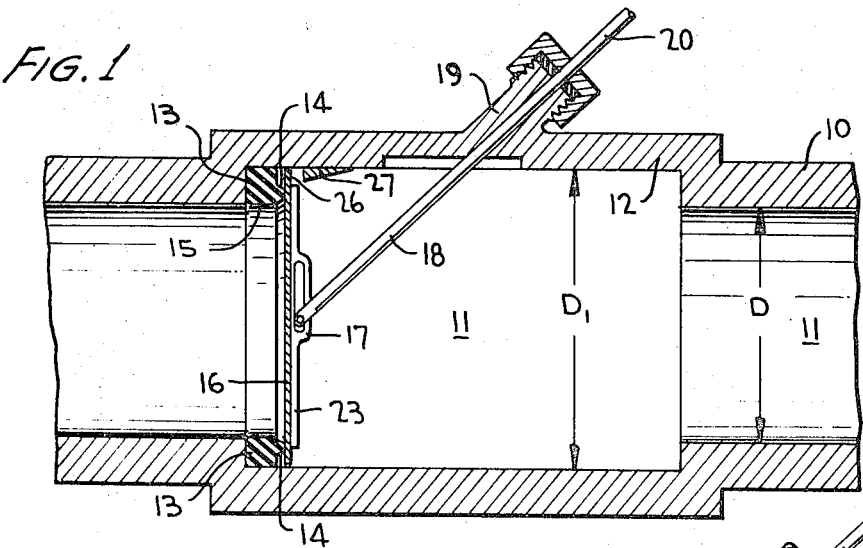
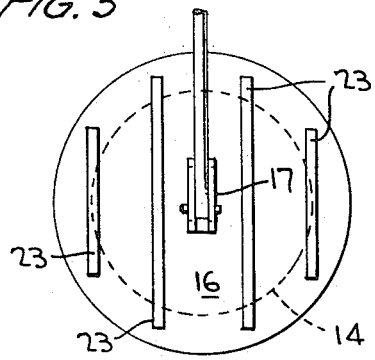
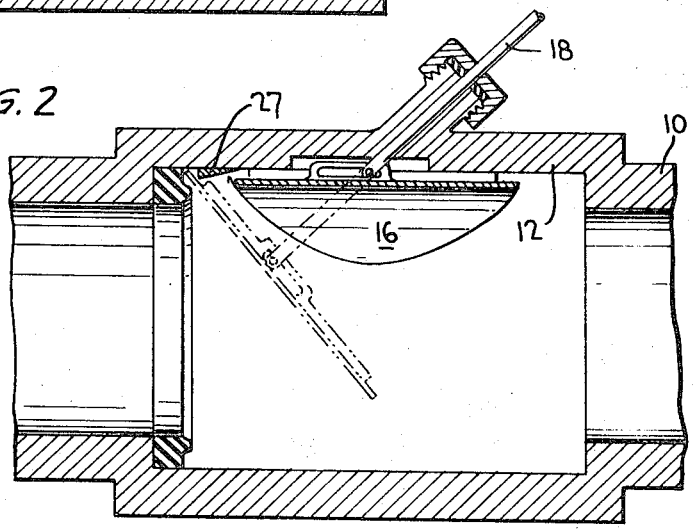
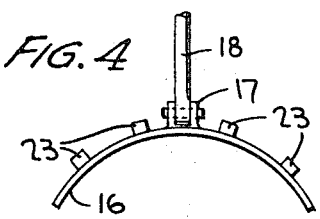
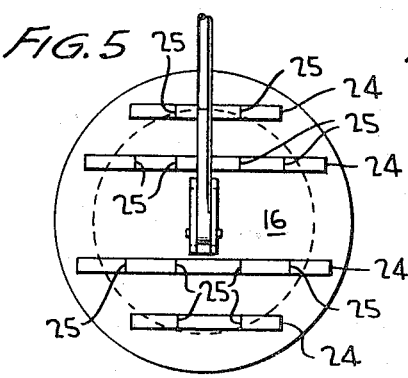
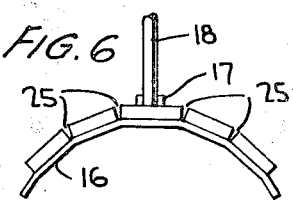
INVENTOR,
ROBERT F. CONRAD 3,539,150

FLUID VALVE

BACKGROUND OF THE INVENTION

This invention relates to a valve for the control of the flow of fluids through enclosed conduits such as pipes and more specifically to valves which are opened and closed rapidly and which present a virtually unrestricted path to the flow of fluid when in the open position and in which upstream fluid pressure aids in achieving a fluid-tight seal when the valve is in the closed position.

Rotary valves afford the advantage of rapid operation. They can generally be closed from a fully opened position, and vice versa, a quarter turn of the valve handle. What is more, the ball- and plug-type valves, which constitute one of the major subgroupings of this class of valves, usually present a virtually unrestricted path to the flow of fluid when in the fully opened position. Unfortunately these valves must be manufactured with considerable precision in order that proper operation be assured. Therefore, these valves are inherently expensive, especially in the larger pipe sizes.

On the other hand butterfly valves, which constitute the other major subgrouping of this class of valves, are not inherently as expensive as the ball- and plug-type valves. However, the structure of these valves is such that the flow path generally is partially obstructed when the valve is fully opened.

It is an object of this invention to provide a more economical construction for a rapidly operable valve which permits unrestricted fluid flow when in the fully opened position than has heretofore been known.

Another object of this invention is to provide a rapidly operable valve in which a flow path is created and interrupted by rotating an element of the valve about an axis which is essentially tangential to the flow channel.

It is a further object of this invention to provide a valve construction in which the fluid pressure in the pipe system controlled by the valve acts to seat the valve when it is in the closed position and yet aids in unseating the valve when it is being opened.

Other objects and advantages of this invention and the manner of their attainment will become apparent from a consideration of this specification and the appended drawing.

BRIEF DESCRIPTION OF THE DRAWING

In the accompanying drawing, FIG. 1 is a cross-sectional representation of an embodiment of the valve of the instant invention, shown in the closed position;

FIG. 2 is a cross-sectional representation of the same valve in the open position;

FIG. 3 is a plan view of the valve disc of the valve of FIG. 1 when seated against the valve seat;

FIG. 4 is an end view of the same valve disc when the valve is in the open position, as shown in FIG. 2;

FIG. 5 is a plan view of an alternative embodiment of a valve disc for use in the valve of FIG. 1, shown in the same position as the valve disc depicted in FIG. 3;

FIG. 6 is an end view of the valve disc shown in FIG. 5 when in the open position, corresponding to the position of the valve disc shown in FIG. 4.

SUMMARY OF INVENTION

The objects and advantages of this invention are achieved with a valve construction in which the valve body defines a flow channel which is circumscribed by an annular valve seat having a central aperture. Associated with this valve seat is a valve disc which, when the valve is in the closed position, closes the central aperture in the valve seat and is urged against the seat by the upstream fluid pressure. The valve is opened by moving the disc away from the valve seat by a motion which is substantially a rotation about a tangent to the valve disc or an axis substantially parallel to such a tangent. Valve operator rod means may be associated with the valve disc to open and close the valve.

In an embodiment of this invention suitable for installation in tubular piping, the valve body has a cylindrical flow channel therethrough, and the valve seat embedded in the valve body is a ring with a central opening of substantially the same diameter as the inside diameter of the said cylindrical flow channel. The valve disc is sufficiently flexible to permit the disc to assume substantially the contour of the cylindrical flow channel when lying flat against it while the valve is in the open position, and nevertheless to assume a planar configuration lying against the valve seat when the valve is in the closed position.

DETAILED DESCRIPTION OF THE PREFERRED EMBODIMENTS OF THE INVENTION

As may best be seen in FIG. 1, valve body 10 defines a flow channel 11 through which passes the fluid to be controlled by the valve. Any suitable means (not shown), such as screwed, flanged or welded connections, can be used to interconnect the said valve body with the other elements of the fluid conduit in which it is to operate.

The most commonly desired flow channel is a substantially cylindrical one. The nominal inner diameter of this valve body may be designated as D. A portion 12 of valve body 10 may advantageously have a somewhat larger internal diameter $D_1$.

Valve seat 13 circumscribes flow channel 11, i.e. the valve seat describes a complete, continuous path around the flow channel and thus defines an aperture 15 which, when closed, permits no flow through said flow channel and effectively closes the valve. Valve seat 13 can be so disposed in valve body 10 as to create substantially no restriction in flow channel 11. Any convenient means (not shown), including a number of means well known to those skilled in this art, may be used to hold valve seat 13 securely in its desired position within valve body 10. Valve seat 13 may circumscribe flow channel 11 in a single plane. If this plane is perpendicular to the axis of flow channel 11, it will provide for the valve seat with the shortest possible perimeter for any given flow channel configuration. On the other hand, some offsetting in the circumscribing path or a circumscribing path in a plane tilted with respect to the perpendicular to the flow channel axis may be employed for specific purposes.

In a valve with a substantially cylindrical flow channel 11, valve seat 13 can be ring-shaped so as to form the perimeter of an opening 15 which may have substantially the same diameter D as has valve body 10. The valve seat may, if desired, contain a protruding lip 14 in order to form a better seating surface for valve disc 16.

Any suitable material, such as relatively firm but nevertheless yieldable polymeric compositions, as for instance polyethylene, Teflon, nylon, polycarbonate or the like, or a relatively soft but accurately machinable metal such as bronze may be used for the valve seat.

The valve element which seats against valve seat 13 and thereby blocks fluid flow through opening 15 is referred to herein as valve disc 16, whether or not this element happens to have a circular profile. Valve disc 16 preferably has a contour corresponding to that of valve seat 13 and is sufficiently large to close off opening 15 completely when seated against valve seat 13. The valve disc must be of sufficient structural strength to resist the force of the fluid acting against it when it is in the closed position. This force is equal to the product of the fluid pressure differential across the valve times the cross-sectional area of the disc.

The valves of this invention are operated by moving the valve disc 16 from its closed position seated against valve seat 13 (shown in FIG. 1) to its open position, i.e. lying substantially flush against the interior surfaces of the valve body which define the flow channel (shown in FIG. 2). When the valve disc is thus in the open position it creates virtually no obstruction in the flow channel. Furthermore, any slight resistance which it may offer to flow will necessarily only obstruct the flow channel in the region near its periphery, where the mass flow rate in laminar flow is at a minimum.

The valve disc 16 must lie relatively flush against the interior walls of valve body 10 when the valve is open. Where the region 11 of the valve body has a rectilinear cross section, this can be accomplished even if disc 16 is of rigid construction. However, in the valves of the instant invention wherein the interior walls in region 11 of the valve body are of curved cross section, as for instance where the valve body defines a cylindrical flow path, disc 16 should be sufficiently flexible to be able to assume the contour of the portion of the interior wall of the valve body against which it lies when in the open position. At the same time the valve disc must have sufficient structural rigidity to resist the force applied thereto by the upstream fluid pressure when the valve is in the closed position.

In an embodiment of the valve wherein the portion 11 of the valve body has a substantially circular interior cross section, valve disc 16 is a circular disc of diameter greater than that of opening 15 in valve seat 13 and, in an embodiment wherein valve seat 13 has a protruding lip 14, valve disc 16 has a diameter greater than that of the circle described by protruding lip 14. In any event, the diameter of valve disc 16 must be less than the internal diameter $D_1$ of the portion of the valve body in which the valve disc operates.

In order for valve disc 16 to have the requisite combination of rigidity and flexibility required of it, it may be fashioned of some stiffly flexible material such as a thin sheet of tempered leaf spring metal or some polymeric material such as teflon or polyethylene sheet.

As may be seen in FIG. 3, a plurality of stiffening members 23 may be affixed to valve disc 16. The exact number and length of the stiffening members will depend upon the dimensions of the particular valve disc and of the magnitude of the fluid pressure which the valve will be expected to resist. It is advantageous, however, for these stiffening members to be sufficiently long to reach that portion of the valve disc which makes contact with the valve seat in order to transmit the force applied by the fluid pressure directly to the valve seat. Furthermore when the stiffening members 23 are oriented in the manner shown in FIG. 3, they do not interfere with the flexing of the valve disc when the latter is in the open position. This is seen in FIG. 4 where valve disc 16 is shown in its flexed position, i.e. the position it must assume to lie substantially flat against the inside surface of valve body 10. As can be seen, flexing has occurred in such a direction that stiffening members 23 are each still in a linear configuration. The result will be obtained when the stiffening members are oriented substantially perpendicularly to the axis of rotation for said valve disc 16.

In another embodiment, as shown in FIG. 5, valve disc 16 is reinforced by a plurality of stiffening members 24 which are each oriented in a direction essentially parallel to that of the axis of rotation for said valve disc 16. An end view of the embodiment of the valve disc shown in FIG. 5, when in the flexed position, is shown in FIG. 6. In this orientation, each of the stiffening members 24 undergoes bending when the valve is opened. In order to facilitate this, each stiffening member 24 has a plurality of weakened sections or notches 25 which permit it to flex. If these sections 25 are slightly V-shaped rather than square, it will be apparent that when the valve is closed, stiffening members 24 will permit the valve disc 16 to assume a configuration with a slight bulge in the down stream direction, which may serve to permit the valve to resist fluid pressure somewhat better than does a planar valve disc.

Attached to the valve disc 16 are valve operator means such as pivot plate 17 and valve operator rod 18 hingedly attached thereto. Operator rod 18 passes through valve body 10 by means of any suitable sealing gland 19. Inasmuch as such sealing glands are well known in the art they will not be described in detail here. The protruding portion 20 of the valve operator rod 18 is manipulated by an operator to open and close the valve.

To open the valve, valve operator rod 18 is moved in a rightward and upward direction, as viewed in FIG. 1. The initial portion of this movement removes a portion of the periphery of valve disc 16 from fluid-tight contact with valve seat 13. In all likelihood this initial unseating of the valve disc occurs where the disc is least resistant to deformation, as for instance between two adjacent stiffening members 23. The breaking of this fluid-tight seal diminishes the pressure difference across the valve and makes it easier to open the valve further by further rightward and upward movement of operator means 18. As the fluid rushes past valve disc 16 at the points of initial unseating, it aids in flexing the valve disc and opening it further.

As the valve opens valve disc 16 describes a motion which approximates a rotation about a tangent to the disc or about an axis parallel to a tangent of the disc. The axis of rotation lies in a plane parallel to that of the disc and somewhat upstream thereof and is significantly closer to the periphery of the disc than to its center. If desired, a small protrusion or boss 27 may be located on the inside surface of the valve body slightly in back (i.e. upstream) of this axis of rotation in order to "trip" the valve seat as it is being drawn into its open position, i.e. in order to initiate the rotational motion described.

In FIG. 2 the valve is shown in the wide-open position, valve operator rod 18 having been drawn upward to its extreme position whereby it pulls valve seat 16 against the inside wall of enlarged portion 12 of valve body 10. As valve operator rod 18 is pushed downward and leftward valve disc 16 is pushed away from its wide-open position against the interior contour of the valve body. As it does so, the valve disc begins to unflex, i.e. to assume a planar configuration. Inasmuch as the valve disc is hingedly attached to valve operator means 18 at a point above its center of gravity, the combined action of gravity upon the valve disc and the fluid pressure behind it will tend to guide the valve disc into a planar orientation perpendicular to the axis of the valve, i.e. an orientation in which the valve disc is in proper alignment for seating against the valve seat. Further downward and leftward pressure on valve operator means 18 seats the valve disc against the valve seat whereupon upstream fluid pressure serves to preserve a tight fluid seal between these elements.

The fact that the valves of the instant invention are opened and closed by rotation of the valve disc about a substantially tangential axis accounts for an inherent advantage which these valves enjoy over butterfly valves in which the valve disc rotates about its own diameter. Whereas, as has been stated, the upstream fluid pressure acts to seat the valve disc in valves of the instant invention more tightly against the valve seat, in the case of a butterfly valve the seating effect of the upstream fluid pressure acting on one portion of the valve disc is cancelled by the action of the fluid pressure acting on the remainder of the substantially centrally pivoted valve disc.

Although the motion of the valve disc is described with reference to an axis of rotation, it is to be emphasized that the structure of these valves need not include a hinge or other fulcrum means fixedly attached to the valve disc and/or valve body. The rotational motion referred to can be a free or unrestricted movement, and can be caused by any convenient means. For instance, in place of operator rod 18 and gland 19, magnetic valve actuating means may be employed, thereby obviating the need for piercing the valve body 10 and eliminating any possibility of leakage.

Other embodiments of this invention will be apparent to those with ordinary skill in this art upon considering this specification and appended drawing. It is my intention to cover all such embodiments, and variations and modifications thereof, within the spirit and scope of this invention with the appended claims.

I claim:

1. A valve comprising:
    a valve body containing interior surfaces defining a totally enclosed channel for the flow of fluid;
    a valve seat circumscribing said channel and defining substantially a single seating plane;
    a valve disc adapted, when said valve is in a closed position, to seat against said valve seat and thereby to block all fluid flow through said channel, said valve disc being adapted to lie substantially parallel to a portion of said interior surface of said valve body when the valve is in the open position, and being flexibly deformable from its planar configuration to a configuration approximating a portion of the contour of said interior surface of said valve body in order to lie substantially flat thereagainst; and valve operator means to move said disc between its said position seated against said valve seat and its said position parallel to a portion of said interior surface of said valve body.

2. The valve of claim 1 wherein said plane is substantially perpendicular to the axis of fluid flow through said valve.

3. A valve comprising:
 a valve body containing interior surfaces defining a totally enclosed channel for the flow of fluid;
 a valve seat circumscribing said channel;
 a valve disc adapted, when said valve is in a closed position, to seat against said valve seat and thereby to block all fluid flow through said channel, said valve disc being adapted to lie substantially parallel to a portion of said interior surface of said valve body when the valve is in the open position, and being flexibly deformable from its planar configuration to a configuration approximating a portion of the contour of said interior surface of said valve body in order to lie substantially flat thereagainst;
 a plurality of rigid elongated stiffening members affixed to said valve disc; and
 valve operator means to move said disc between its said position seated against said valve seat and its said position parallel to a portion of said interior surface of said valve body.

4. The valve of claim 3 wherein said stiffening members are aligned substantially parallel to the flow axis of said channel when said valve disc is in the open position.

5. The valve of claim 3 wherein said stiffening members are not substantially parallel to said flow axis and are notched to permit the flexing of said valve seat when in the open position.

6. The valve of claim 5 wherein the notches in said stiffening members are generally V-shaped.

7. The valve for controlling the flow of fluid in a pipe comprising:
 a valve body defining a substantially cylindrical flow channel therethrough;
 a ring-shaped valve seat surrounding said flow channel and defining a central opening therethrough;
 a thin, flexible circular valve disc having a diameter greater than that of said opening; said valve disc being sufficiently flexible to be distended from a planar configuration to the contour of a portion of the interior surface of the valve body when lying thereagainst; and
 valve operator means to move said disc between its position against said valve seat and its position against said valve body.

8. A valve for controlling the flow of fluid in a pipe comprising:
 a valve body defining a substantially cylindrical flow channel therethrough;
 a ring-shaped valve seat surrounding said flow channel and defining a central opening therethrough;
 a thin, flexible circular valve disc having a diameter greater than that of said opening; said valve disc being sufficiently flexible to be distended from a planar configuration to the contour of a portion of the interior surface of the valve body when lying thereagainst;
 a plurality of stiffening members affixed to a surface of said disc to support said disc in a planar configuration when seated against said seat; and
 valve operator means to move said disc between its position against said valve seat and its position against said valve body.

9. The valve of claim 8 wherein said stiffening members are aligned substantially parallel to the flow axis of said channel when said valve disc is in the open position.

10. The valve of claim 8 wherein said stiffening members are not substantially parallel to said flow axis and are notched to permit the flexing of said valve seat when in the open position.

11. The valve of claim 10 wherein the notches in said stiffening members are generally V-shaped.

12. A valve for controlling the flow of fluid in a pipe comprising:
 a valve body defining a substantially cylindrical flow channel therethrough;
 a ring-shaped valve seat surrounding said flow channel and defining a central opening therethrough;
 a thin, flexible circular valve disc having a diameter greater than that of said opening; said valve disc being sufficiently flexible to be distended from a planar configuration to the contour of a portion of the interior surface of the valve body when lying thereaginst; and
 valve operator means to move said disc between its position against said valve seat and its position against said valve body, said valve operator means comprising a rod hingedly attached at one end to said valve disc, the other end of said rod means protruding through said valve body.